United States Patent
Kwon et al.

(10) Patent No.: US 8,885,243 B2
(45) Date of Patent: Nov. 11, 2014

(54) ELECTROWETTING DISPLAY DEVICE AND METHOD OF MANUFACTURING THE SAME

(71) Applicant: Liquavista B.V., Eindhoven (NL)

(72) Inventors: Seonggyu Kwon, Suwon-si (KR); Sang-Myoung Lee, Seoul (KR); Gwan Ha Kim, Hwaseong-si (KR); Sunghwan Kim, Yongin-si (KR)

(73) Assignee: Liquavista B.V., Eindhoven (NL)

( * ) Notice: Subject to any disclaimer, the term of this patent is extended or adjusted under 35 U.S.C. 154(b) by 0 days.

(21) Appl. No.: 13/716,538

(22) Filed: Dec. 17, 2012

(65) Prior Publication Data

US 2014/0036341 A1 Feb. 6, 2014

(30) Foreign Application Priority Data

Aug. 6, 2012 (KR) .................. 10-2012-0085831

(51) Int. Cl.
*G02B 26/00* (2006.01)
*H01J 9/00* (2006.01)

(52) U.S. Cl.
CPC ............. *G02B 26/005* (2013.01); *H01J 9/00* (2013.01)
USPC ............................................. 359/290

(58) Field of Classification Search
CPC .. G02B 26/005; G02B 26/004; G09G 3/3433; G09G 2300/0426
USPC ............... 359/245, 228, 253, 315, 318, 665, 359/290–292; 345/41, 48, 60, 84, 204; 349/1, 12
See application file for complete search history.

(56) References Cited

U.S. PATENT DOCUMENTS

| | | | |
|---|---|---|---|
| 7,215,404 B2 | 5/2007 | Chun et al. | |
| 7,548,363 B2 | 6/2009 | Hayes et al. | |
| 7,746,540 B2 * | 6/2010 | Lo et al. ................. | 359/290 |
| 7,800,816 B2 | 9/2010 | Hayes et al. | |
| 7,813,030 B2 * | 10/2010 | Lo et al. ................. | 359/295 |
| 7,993,819 B2 | 8/2011 | Lo et al. | |
| 8,068,266 B2 | 11/2011 | Kim et al. | |
| 8,111,447 B2 | 2/2012 | Fairly et al. | |
| 8,189,267 B2 | 5/2012 | Slack et al. | |
| 8,498,041 B2 * | 7/2013 | Komatsu ................. | 359/296 |
| 2009/0195850 A1 | 8/2009 | Takahashi | |
| 2010/0108232 A1 | 5/2010 | Chen et al. | |

(Continued)

FOREIGN PATENT DOCUMENTS

| KR | 10-2005-0061859 | 6/2005 |
|---|---|---|
| KR | 10-2009-0021425 | 3/2009 |

(Continued)

*Primary Examiner* — Tuyen Tra
(74) *Attorney, Agent, or Firm* — Lee & Hayes, PLLC

(57) ABSTRACT

An electrowetting display device including a first base substrate, a second base substrate facing the first base substrate, a first electrode disposed on the first base substrate, a second electrode disposed on the second base substrate to face the first electrode, a partition wall disposed between the first and second electrodes to define a receiving area, a hydrophobic layer disposed on the first electrode, a hydrophilic layer disposed on the second electrode, and first and second fluids accommodated in the receiving area and immiscible with each other. At least one of the first fluid and the second fluid has a polarity. The hydrophilic layer allows droplets separated from a hydrophobic fluid of the first and second fluids to be merged with the hydrophobic fluid. Accordingly, a change in amount of the fluids in each pixel is prevented.

23 Claims, 12 Drawing Sheets

(56) References Cited

U.S. PATENT DOCUMENTS

2011/0013255 A1 1/2011 Hsieh
2011/0084944 A1 4/2011 Bae
2011/0181952 A1 7/2011 Kim et al.
2012/0019523 A1 1/2012 Lee et al.

FOREIGN PATENT DOCUMENTS

| KR | 10-2011-0071276 | 6/2011 |
| KR | 10-2011-0112946 | 10/2011 |
| KR | 10-2011-0119978 | 11/2011 |

* cited by examiner

ELECTROWETTING DISPLAY DEVICE AND METHOD OF MANUFACTURING THE SAME

CROSS-REFERENCE TO RELATED APPLICATION

This U.S. non-provisional patent application claims priority from and the benefit of Korean Patent Application No. 10-2012-0085831, filed on Aug. 6, 2012, which is hereby incorporated by reference for all purposes as if fully set forth herein.

BACKGROUND FIELD

Exemplary embodiments of the present invention relate to an electrowetting display device and a method of manufacturing the same. More particularly, exemplary embodiments of the present invention relate to an electrowetting display device having improved display characteristics and a method of manufacturing the electrowetting display device.

DISCUSSION OF THE BACKGROUND

An electrowetting phenomenon causes movement or deformation of fluid by applying a voltage to the fluid in order to change a surface tension of the fluid. In detail, a display device that displays an image using electrowetting is called an electrowetting display device.

The electrowetting display device does not have a polarizing plate, and thus the electrowetting display device has various properties, such as high transmittance and reflectance, low power consumption, fast response speed, etc. Accordingly, a next generation display device which utilizes electrowetting has been developed.

SUMMARY

Exemplary embodiments of the present invention provide an electrowetting display device capable of preventing light leakage caused by a separation phenomenon of a fluid.

Exemplary embodiments of the present invention also provide a method of manufacturing the electrowetting display device.

Additional features of the invention will be set forth in the description which follows, and in part will be apparent from the description, or may be learned by practice of the invention.

An exemplary embodiment of the present invention discloses an electrowetting display device which includes a first base substrate, a second base substrate facing the first base substrate, a first electrode disposed on the first base substrate, a second electrode disposed on the second base substrate and arranged to face the first electrode, a partition wall disposed between the first and second electrodes and configured to define a receiving area, a hydrophobic layer is disposed on the first electrode, a hydrophilic layer disposed on the second electrode, and first and second fluids accommodated in the receiving area and immiscible with each other. At least one of the first fluid and the second fluid has a polarity.

An exemplary embodiment of the present invention also discloses a method of manufacturing an electrowetting display device including forming a first electrode on a first base substrate, forming a second electrode on a second base substrate, forming a hydrophilic layer on the second electrode, forming a partition wall between the hydrophilic layer and the first electrode to define a receiving area, forming a hydrophobic layer on the first electrode, and forming first and second fluids in the receiving area, the first and second fluids being immiscible with each other, wherein at least one of the first fluid and the second fluid has a polarity.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
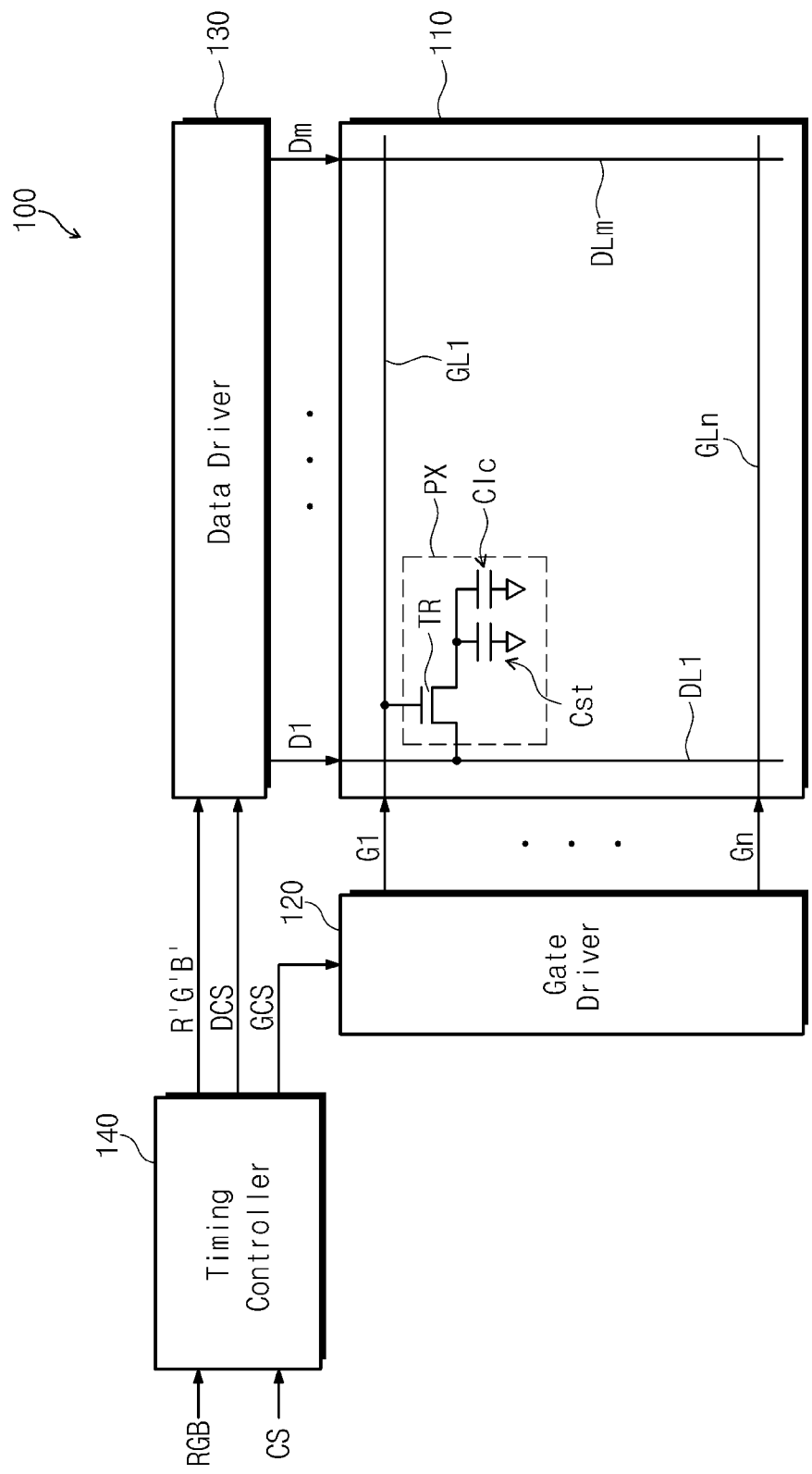
FIG. 1 is a block diagram showing an electrowetting display device according to an exemplary embodiment of the present invention.

The invention is described more fully hereinafter with reference to the accompanying drawings, in which embodiments of the invention are shown. The invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on", "connected to" or "coupled to" another element or layer, it can be directly on, directly connected to, or directly coupled to the other element or layer, or intervening elements or layers may be present. In contrast, when an element is referred to as being "directly on,"

"directly connected to," or "directly coupled to" another element or layer, there are no intervening elements or layers present. As used herein, the term "and/or" includes any and all combinations of one or more of the associated listed items. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

FIG. 1 is a block diagram showing an electrowetting display device according to an exemplary embodiment of the present invention.

Referring to FIG. 1, an electrowetting display device 100 includes a display panel 110, a gate driver 120, a data driver 130, and a timing controller 140. Hereinafter, the electrowetting display device 100 is referred to as a display device.

The timing controller 140 receives image signals RGB and control signals CS from outside of the display device 100. The timing controller 140 converts a data format of the image signals RGB to a data format appropriate to an interface between the data driver 130 and the timing controller 140, and applies the converted image signals R'G'B' to the data driver 130. In addition, the timing controller 140 applies a data control signal DCS, e.g., an output start signal, a horizontal start signal, and a polarity inversion signal, etc., to the data driver 130.

The timing controller 140 applies a gate control signal GCS, e.g., a vertical start signal, a vertical clock signal, a vertical clock bar signal, etc., to the gate driver 120.

The gate driver 120 sequentially outputs gate signals G1 to Gn in response to the gate control signal GCS provided from the timing controller 140.

The data driver 130 converts the image signals R'G'B' to data voltages D1 to Dm in response to the data control signal DCS provided from the timing controller 140. The data voltages D1 to Dm are applied to the display panel 110.

The display panel 110 includes a plurality of gate lines GL1 to GLn, a plurality of data lines DL1 to DLm crossing the gate lines GL1 to GLn, and pixels PX.

In the present exemplary embodiment, the pixels PX each have the same structure and function, and thus for the convenience of explanation, only one pixel is shown in FIG. 1.

Each pixel PX includes a thin film transistor TR, a liquid crystal capacitor Clc, and a storage capacitor Cst. The liquid crystal capacitor Clc includes a pixel electrode and a common electrode, and the storage capacitor Cst includes a pixel electrode and a storage electrode.

The thin film transistor TR includes a gate electrode connected to a corresponding gate line of the gate lines GL1 to GLn, a source electrode connected to a corresponding data line of the data lines DL1 to DLm, and a drain electrode connected to the pixel electrode.

The gate lines GL1 to GLn are connected to the gate driver 120 to receive the gate signals G1 to Gn, respectively. The data lines DL1 to DLm are connected to the data driver 130 to receive the data voltages D1 to Dm respectively provided from the data driver 130.

The thin film transistor TR of each pixel PX is turned on in response to a corresponding gate signal provided through the corresponding gate line, and a corresponding data voltage applied to the corresponding data line is applied to the pixel electrode through the turned-on thin film transistor TR.

Although not shown in FIG. 1, the display device 100 may further include a backlight unit (not shown) disposed adjacent to the display panel 110 to provide light to the display panel 100. The backlight unit may include a plurality of light sources, each including, for example, a light emitting diode or a cold cathode fluorescent lamp.

Figure 2:
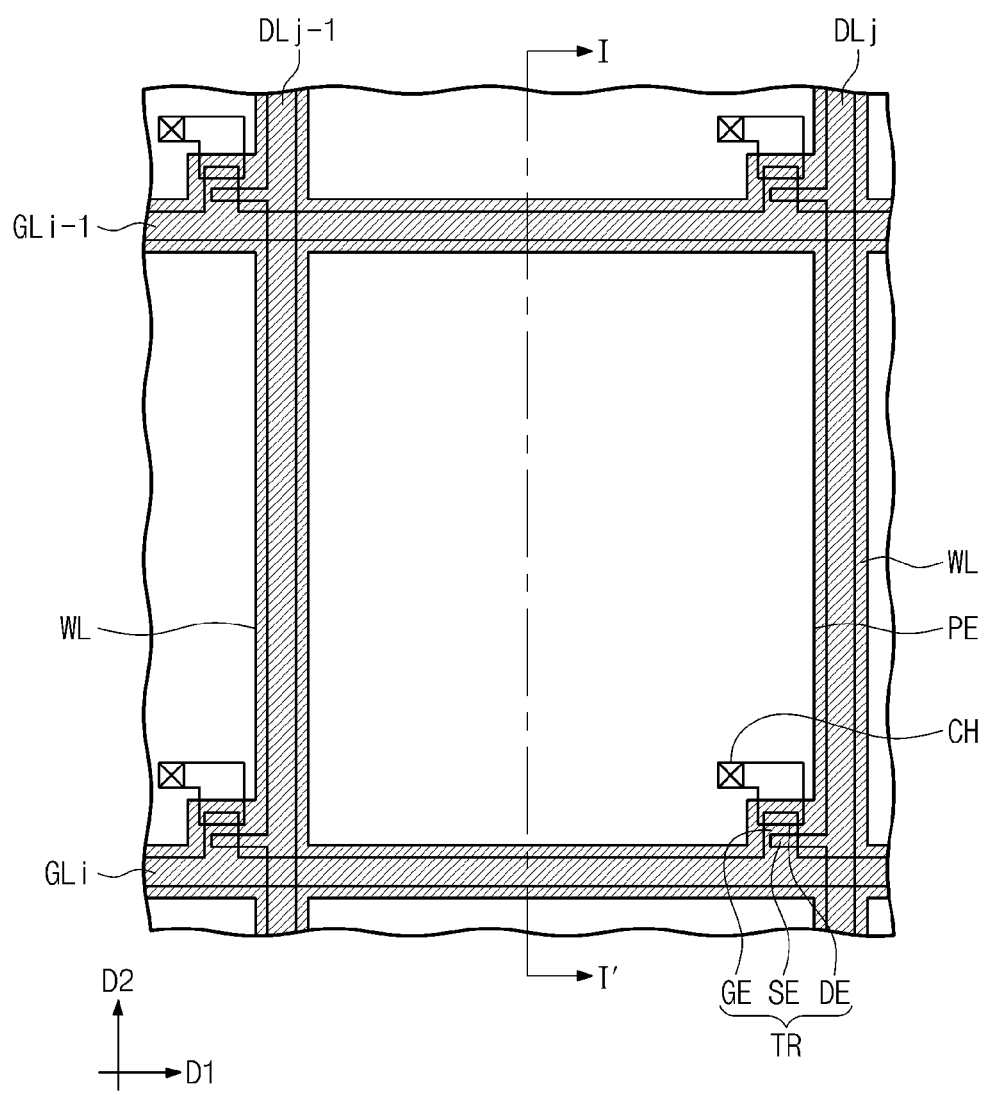
FIG. 2 is a plan view showing a pixel shown in FIG. 1.
Figure 3:
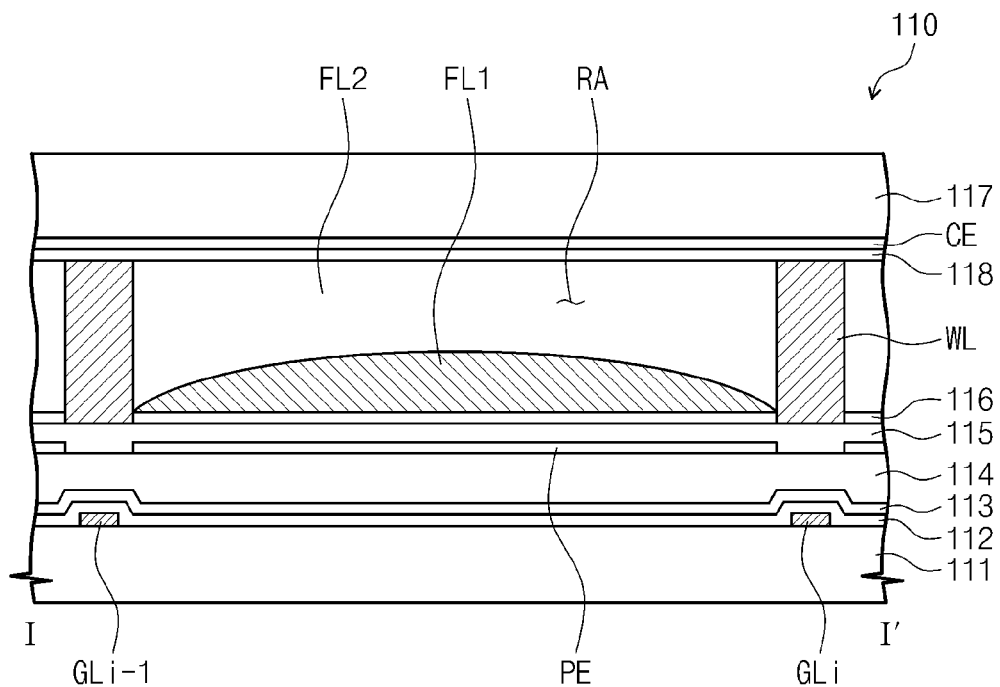
FIG. 3 and FIG. 4 are cross-sectional views taken along a line I-I' of FIG. 2.
Figure 4:
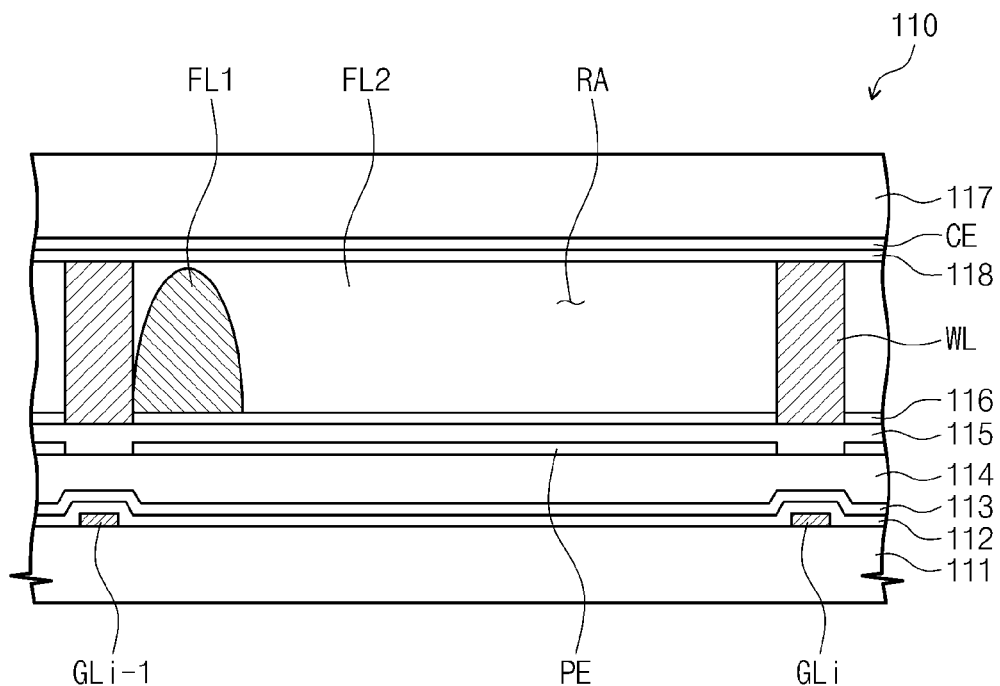

FIG. 2 is a plan view showing a pixel shown in FIG. 1 and FIGS. 3 and 4 are cross-sectional views taken along a line I-I' of FIG. 2. Because each of the pixels shown in FIG. 1 have the same structure and function, for the convenience of explanation, only one pixel is shown in FIGS. 2, 3, and 4. In addition, FIG. 3 shows the pixel in an off-state, and FIG. 4 shows the pixel in an on-state.

Referring to FIGS. 2 to 4, the display panel 110 includes a first base substrate 111 and a second base substrate 117, which face each other. The first and second base substrates 111 and 117 may include a flexible material, such as polyethylene terephthalate (PET), fiber reinforced plastic (FRP), polyethylene naphthalate (PEN), etc.

The first base substrate 111 includes first and second gate lines GLi-1 and GLi extending in a first direction D1, and first and second data lines DLj-1 and DLj extending in a second direction D2 substantially perpendicular to the first direction D1, which are disposed thereon. The first data line DLj-1 and the second data line DLj are electrically insulated from the first and second gate lines GLi-1 and GLi while crossing the first and second gate lines GLi-1 and GLi.

The first base substrate 111 further includes the thin film transistor TR connected to the first gate line GLi-1 and the second data line DLj, and the pixel electrode PE electrically connected to the thin film transistor TR. The thin film transistor TR includes the gate electrode GE branched from the second gate line GLi, the source electrode SE branched from the second data line DLj, and the drain electrode DE electrically connected to the pixel electrode PE.

The stack structure of the layers disposed on the first base substrate 111 will be described with reference to FIG. 3.

Referring to FIGS. 2 and 3, the first and second gate lines GLi-1 and GLi and the gate electrode GE are disposed on the first base substrate 111. A gate insulating layer 112 is disposed on the first base substrate 111 to cover the first and second gate lines GLi-1 and GLi and the gate electrode GE.

Although not shown in the figures, a semiconductor layer is disposed on the gate insulating layer 112. The semiconductor layer is disposed in an area corresponding to an area in which the gate electrode GE is formed and includes an active layer and an ohmic contact layer.

The source electrode SE and the drain electrode DE are disposed on the semiconductor layer and are spaced apart from each other. The source electrode SE and the drain electrode DE are covered by a protective layer 113, and an organic insulating layer 114 is disposed on the protective layer 113. The protective layer 113 and the organic insulating layer 114 are provided with a contact hole CH formed therethrough to expose the drain electrode DE of the thin film transistor TR.

The pixel electrode PE is disposed on the organic insulating layer 114. The pixel electrode PE is electrically connected to the drain electrode DE through the contact hole CH. The pixel electrode PE may include indium tin oxide (ITO) or indium zinc oxide (IZO).

Although not shown in the figures, a reflective electrode may be further disposed on the pixel electrode PE. The reflective electrode may be used to reflect the light incident thereto when the display device 100 is used as a reflective type display device or a transflective type display device. Accordingly, the reflective electrode may be formed of a metal material having high reflectivity, e.g., aluminum.

The pixel electrode PE is spaced apart from adjacent pixel electrodes of pixels adjacent thereto so as to be electrically insulated from the adjacent pixel electrodes.

A barrier layer 115 is disposed on the pixel electrode PE. The barrier layer 115 has a single-layer structure, but it should not be limited thereto. That is, the barrier layer 115 may have a double-layer structure, a triple-layer structure, or a multi-layer structure. As an example, the barrier layer 115 may include silicon oxide (SiOx) or silicon nitride (SiNx).

A partition wall WL is disposed on the barrier layer 115 to partition the pixels from each other. The partition wall WL is used to define a receiving area RA in each pixel. The partition wall WL is disposed in an area between the pixel electrode PE and the adjacent pixel electrode PE of the adjacent pixel and partially overlaps the pixel electrode PE when viewed in a plan view.

In addition, as shown in FIG. 2, the partition wall WL is located along the first and second gate lines GLi-1 and GLi and the first and second data lines DLj-1 and DLj.

In the receiving area RA, a hydrophobic layer 116 is disposed on the barrier layer 115 and between each partition wall WL. The hydrophobic layer 116 includes a material having a hydrophobic property, e.g., a compound containing fluorine atoms or a layer having a surface modified to have the hydrophobic property. As an example, the hydrophobic layer 115 may include amorphous Teflon®, such as AF1600 manufactured by DuPont, Cytop fluoropolymer manufactured by Asahi Glass, or Hyflon® AD manufactured by Solvay Solexis.

The common electrode CE is disposed on the second base substrate 117. The common electrode CE faces the pixel electrode PE and receives a common voltage.

In the present exemplary embodiment, the pixel electrode PE is disposed on the first base substrate 111 and the common electrode CE is disposed on the second base substrate 117, but they should not be limited thereto or thereby. For instance, the pixel electrode PE and the common electrode CE may be disposed on the first base substrate 111. In this case, the common electrode CE is disposed adjacent to at least one side of the pixel electrode PE and insulated from the pixel electrode PE. That is, the pixel electrode PE is disposed in a portion of the pixel area surrounding by the partition wall WL, and the common electrode CE is disposed on a lower portion or a side surface of the partition wall WL and spaced apart from the pixel electrode PE.

A hydrophilic layer 118 is further disposed on the common electrode CE. The hydrophilic layer 118 may be formed of the same material as the partition wall WL. As an example, the partition wall WL and the hydrophilic layer 118 may be formed of an organic insulating material having hydrophilicity.

In addition, a contact angle of water with respect to the hydrophilic layer 118 may be about 20° or less.

As shown in FIGS. 3 and 4, the upper surface of the partition wall WL makes contact with the hydrophilic layer 118. Thus, the partition wall WL serves as a spacer to maintain a distance between the first base substrate 111 and the second base substrate 117.

As an example, the display panel 110 may have a cell gap of about 40 micrometers or less. In this case, the partition wall WL maintains the cell gap and has a height of about 40 micrometers or less.

In addition, the partition wall WL may include an elastic material having a high rate of change in height, e.g., about 2% or more. Accordingly, when the partition wall WL formed of the elastic material serves as the spacer, external impacts applied to the display panel 110 may be relieved.

First and second fluids FL1 and FL2 are disposed between the first and second base substrates 111 and 117. In particular, the first and second fluids FL1 and FL2 are accommodated in the receiving area RA defined by the partition wall WL.

In detail, the first fluid FL1 is not electrically conductive, and includes a material with hydrophobicity. This material may include an alkane, such as hexadecane, or oil, such as silicone oil. In addition, the first fluid FL1 may include dyes and pigments representing red, green, and blue colors or other materials representing red, green, and blue colors. The second fluid FL2 is electrically conductive or has a polarity, and may include a mixture of water and ethyl alcohol, in which potassium chloride is dissolved, or sodium chloride solution (aq.). Accordingly, the first and second fluids FL1 and FL2 have different specific gravities from each other, and the first and second fluids FL1 and FL2 are immiscible with each other and separated from each other with an interface therebetween.

As another example, the first fluid FL1 may include a black dye or a material absorbing light to absorb the light incident thereto. In this case, the display panel 110 may further include color filter layers disposed between the second base substrate 117 and the common electrode CE to represent the red, green, and blue colors.

As shown in FIG. 4, when voltages are respectively applied to the pixel electrode PE and the common electrode CE, the pixel PX is in an on-state. An electrostatic force caused by an electric potential difference between the pixel electrode PE and the common electrode CE, i.e., attractive and repulsive forces, moves the second fluid FL2 toward the pixel electrode PE. The first fluid FL1, which covers the hydrophobic layer 116 when the pixel PX is in the off-state, as shown in FIG. 3, is pushed out to the partition wall WL due to the movement of the second fluid FL2. Thus, the first fluid FL1 has a maximum height when the pixel PX is in the on-state and the hydrophobic layer 116 is exposed in the pixel PX that is in the on-state.

When the electric potential difference between the pixel electrode PE and the common electrode CE returns to about zero volts, the pixel PX returns to the off-state, as shown in FIG. 3. Accordingly, the electrostatic force caused by the electric potential difference disappears and the first fluid FL1 covers the hydrophobic layer 116 again. As described above, the first fluid FL1 serves as an optical switch that is able to be electrically controlled in each pixel PXL.

Figure 5A:
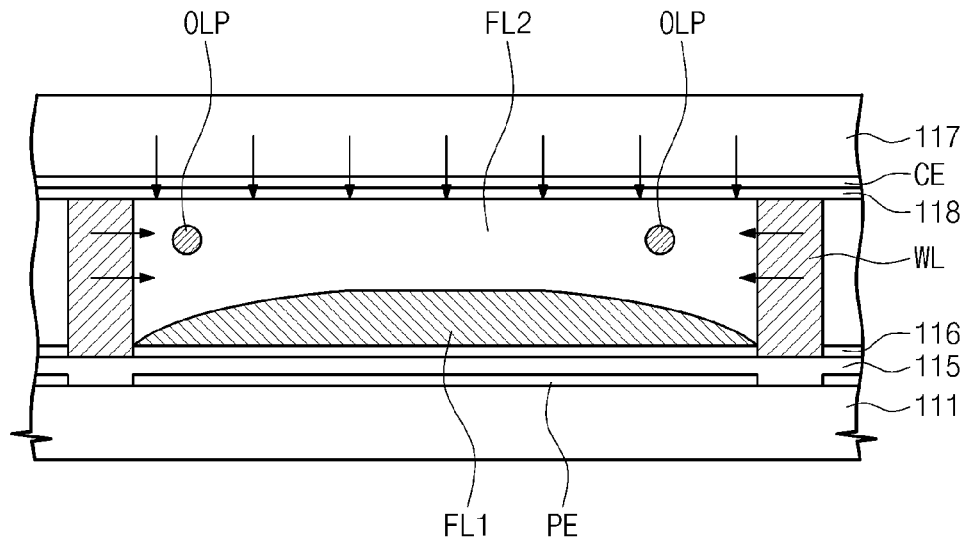
FIG. 5A, FIG. 5B, and FIG. 5C are cross-sectional views showing oil droplets separated from a first fluid and merged with the first fluid again.
Figure 5B:
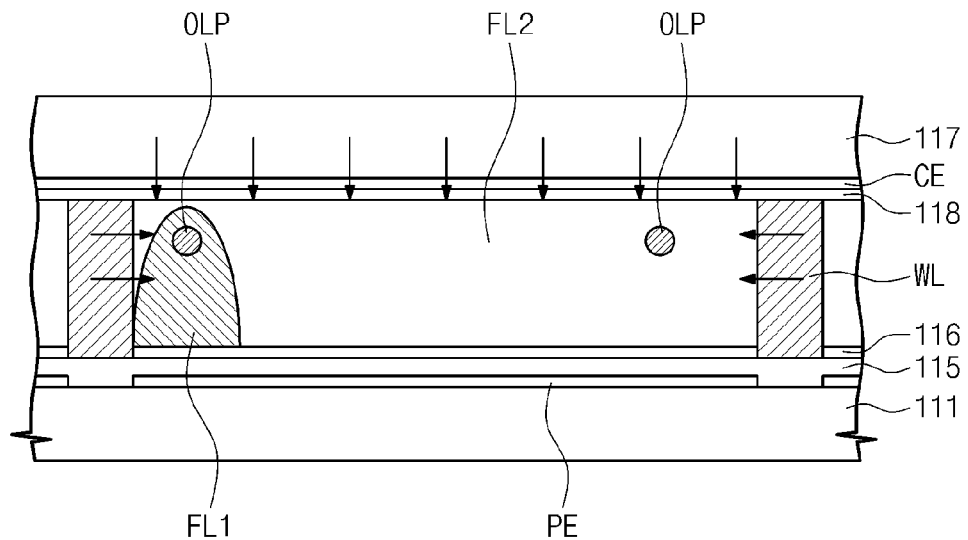
Figure 5C:
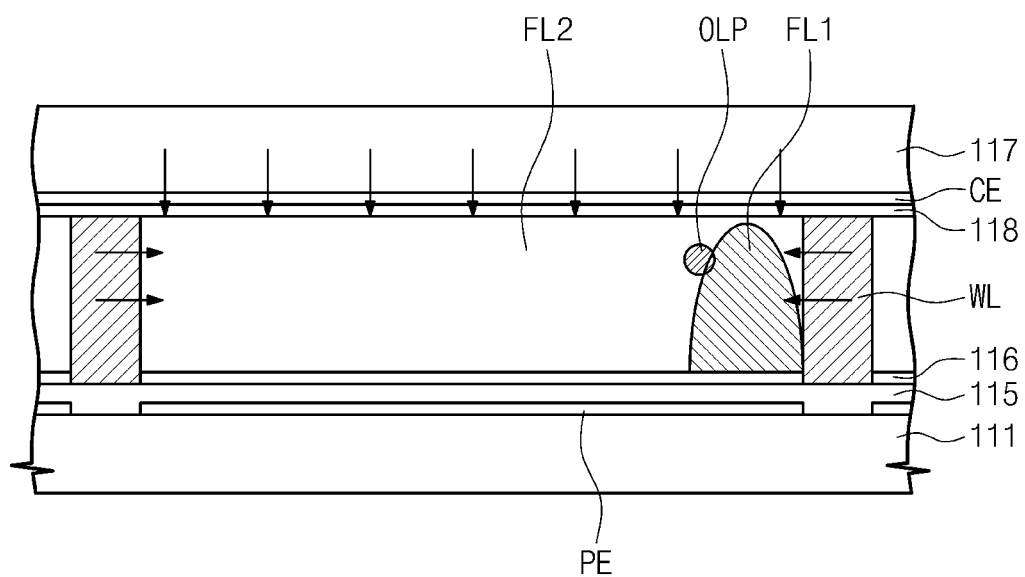

FIGS. 5A to 5C are cross-sectional views showing oil droplets separated from a first fluid and merged with the first fluid again. In FIGS. 5A to 5C, for the convenience of explanation, the layers disposed between the first base substrate 111 and the pixel electrode PE are omitted, but various layers may be interposed between the first base substrate 111 and the pixel electrode PE as described above.

Referring to FIG. 5A, when the display panel 110 is subjected to external impacts oil droplets OLP may be separated from the first fluid FL1. The receiving area RA is defined in each pixel by the partition wall WL, and the upper surface of the partition wall WL makes contact with the hydrophilic layer 118 to close the receiving area RA. Therefore, the partition wall WL prevents the oil droplets OLP separated from the first fluid FL1 from moving toward adjacent pixels.

In addition, because the partition wall WL and the hydrophilic layer 118 include the hydrophilic material, the oil droplets OLP are pushed to the receiving area RA without being attached to the barrier wall WL or the hydrophilic layer 118.

As shown in FIGS. 5B and 5C, when the pixel PX is in the on-state, the first fluid FL1 is pushed out to the partition wall WL by the second fluid FL2. As described above, the first fluid FL1 may be merged with the oil droplets OLP wandering in the receiving area RA while being pushed to the partition wall WL.

As described above, because the receiving area RA is closed by the partition wall WL, the oil droplets OLP separated from the first fluid FL1 as a result of external impacts may be prevented from moving to the adjacent pixels. In addition, the oil droplets OLP separated from the first fluid FL1 are pushed to the first fluid FL1 by the partition wall WL and the hydrophilic layer 118, and thus the oil droplets OLP may again be merged with the first fluid FL1. Thus, a brightness difference, which is caused by a variation in the amount of the first fluid FL1 accommodated in the pixels PX, can be prevented from occurring.

Figure 6:
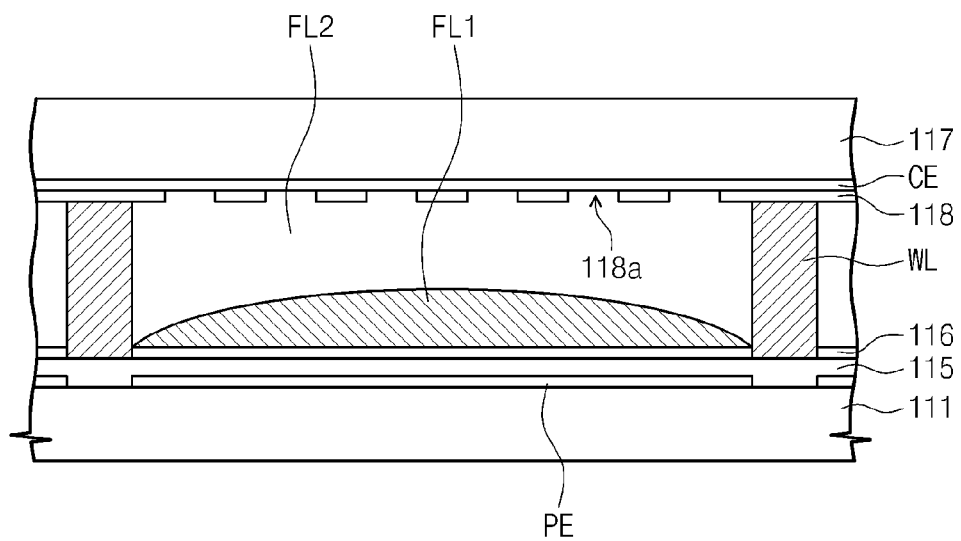
FIG. 6 is a cross-sectional view showing an electrowetting display device according to still another exemplary embodiment of the present invention.
Figure 7:
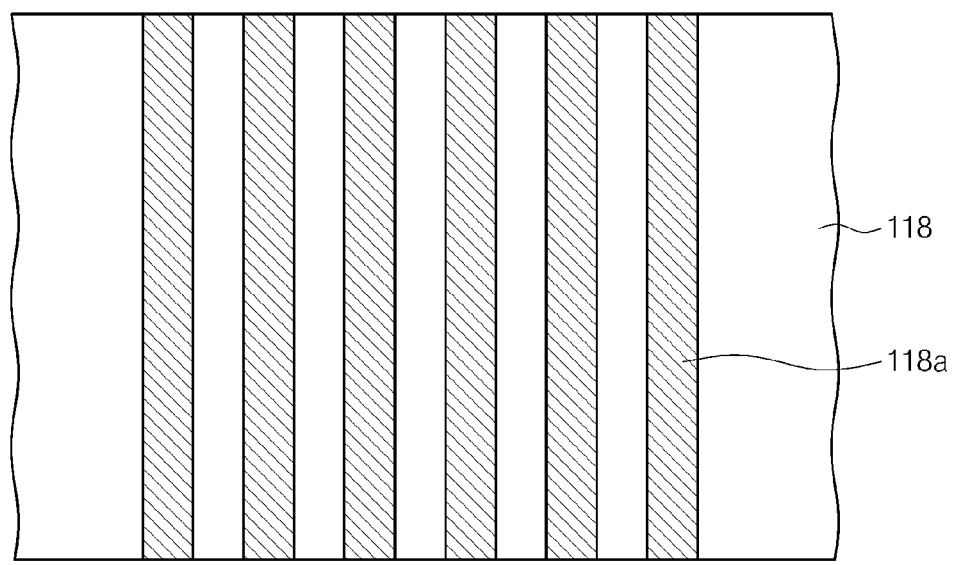
FIG. 7 is a plan view showing a common electrode and a hydrophilic layer shown in FIG. 6.

FIG. 6 is a cross-sectional view showing an electrowetting display device according to another exemplary embodiment of the present invention, and FIG. 7 is a plan view showing a common electrode and a hydrophilic layer shown in FIG. 6. In FIG. 6, the same reference numerals denote the same elements in FIG. 3, and thus detailed descriptions of the same elements will be omitted.

Referring to FIG. 6, a display panel according to another exemplary embodiment has the same structure as the display panel 110 shown in FIG. 3 except that a plurality of first openings 118a is formed through the hydrophilic layer 118. In FIG. 6, layers interposed between the first base substrate 111 and the pixel electrode PE are not shown, but the layers shown in FIG. 3 are substantially interposed between the first base substrate 111 and the pixel electrode PE.

The first openings 118a formed through the hydrophilic layer 118 partially expose the common electrode CE disposed under the hydrophilic layer 118. As described above, when the pixel PX is in the on-state, the electric potential difference occurs between the common electrode CE and the pixel electrode PE. Because the hydrophilic layer 118 is an insulating material, the electric potential difference may be less than a desired electric potential difference as a result of the hydrophilic layer 118 such that one of the voltages respectively applied to the common electrode CE and the pixel electrode PE may be boosted to form the desired electric potential difference.

Accordingly, when the hydrophilic layer 118 disposed on the common electrode CE is partially opened, the desired electric potential difference may be obtained even though the voltages respectively applied to the common electrode CE and the pixel electrode PE are not boosted.

As shown in FIG. 7, the openings 118a formed through the hydrophilic layer 118 are spaced apart from each other, and each opening 118a has a stripe shape. In addition, the openings 118a may be provided in a slit shape.

Figure 8:
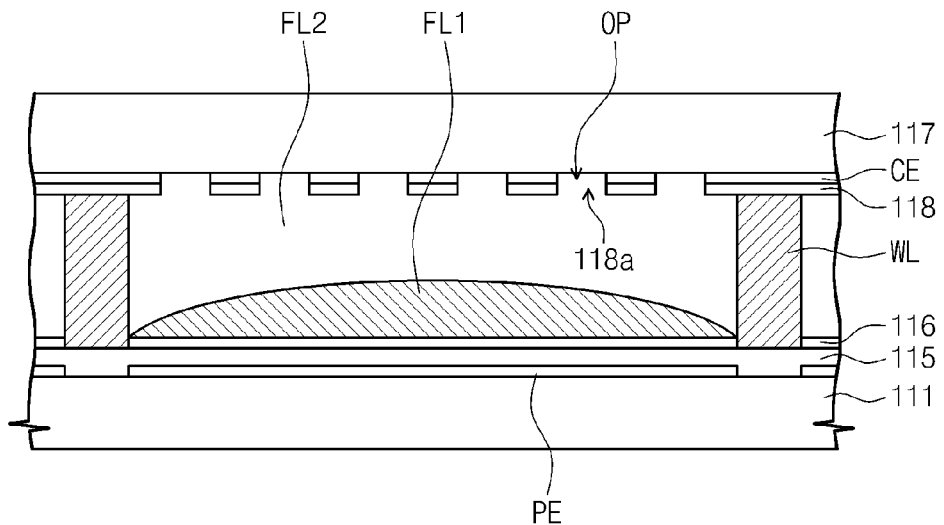
FIG. 8 is a cross-sectional view showing an electrowetting display device according to still another exemplary embodiment of the present invention.

FIG. 8 is a cross-sectional view showing an electrowetting display device according to another exemplary embodiment of the present invention.

Referring to FIG. 8, a display panel of the electrowetting display device according to another exemplary embodiment has the same structure and function as those of the display panel shown in FIG. 6 except that a plurality of second openings OP are formed through the common electrode CE.

When the hydrophilic layer 118 is formed on the common electrode CE, the light may be refracted by the difference in refractive index between the common electrode CE and the hydrophilic layer 118. When the light exiting through the display panel is refracted, a transmittance of the display device 100 is decreased.

As an example, the second openings OP are formed through the common electrode CE to correspond to the first openings 118a, respectively, so as to prevent a decrease in the transmittance of the display panel. That is, portions of the common electrode CE are removed from the areas in which the first openings 118a are formed, and thus the transmittance of the display device 100 is increased.

Figure 9:
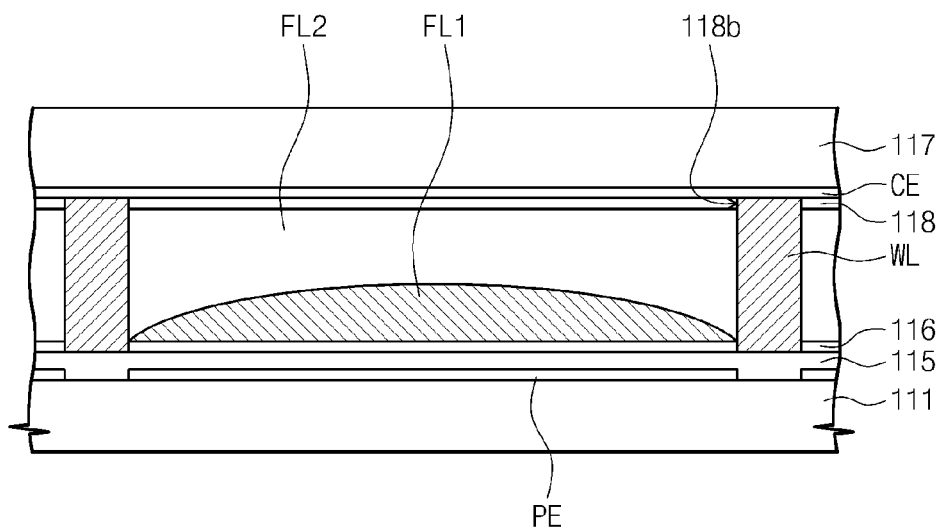
FIG. 9 is a cross-sectional view showing an electrowetting display device according to still another exemplary embodiment of the present invention.
Figure 10:
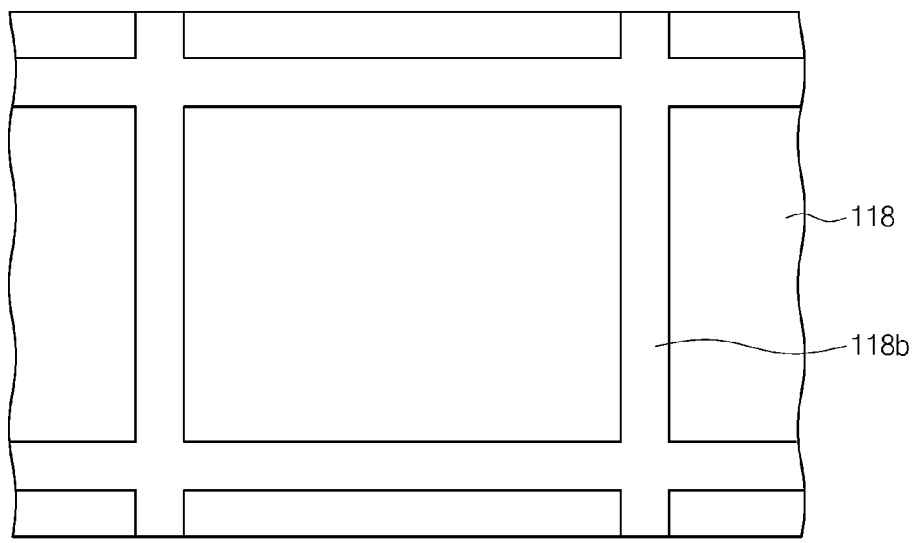
FIG. 10 is a plan view showing a hydrophilic layer shown in FIG. 9.

FIG. 9 is a cross-sectional view showing an electrowetting display device according to another exemplary embodiment of the present invention, and FIG. 10 is a plan view showing a hydrophilic layer shown in FIG. 9.

Referring to FIGS. 9 and 10, a display panel of the electrowetting display device according to another exemplary embodiment has the same structure and function as those of the display panel shown in FIG. 3 except that a plurality of third openings 118b is formed through the hydrophilic layer 118. In FIG. 9, for the convenience of explanation, the layers disposed between the first base substrate 111 and the pixel electrode PE are omitted, but various layers may be interposed between the first base substrate 111 and the pixel electrode PE, as described above.

The third openings 118b formed through the hydrophilic layer 118 are located at a position corresponding to the partition wall WL. In detail, the third openings 118b are formed to allow the common electrode CE to be exposed through the area in which the partition wall WL is formed. As a result of the third openings 118b, a space is formed in the hydrophilic layer 118 to accommodate an upper portion of the partition wall WL, so that the partition wall WL is fixed to the hydrophilic layer 118 by inserting the upper portion of the partition wall WL into the space formed in the hydrophilic layer 118.

As shown in FIG. 10, the third openings 118b are formed through the hydrophilic layer 118 and have a closed-loop shape corresponding to the area in which the partition wall WL is formed.

Figure 11:
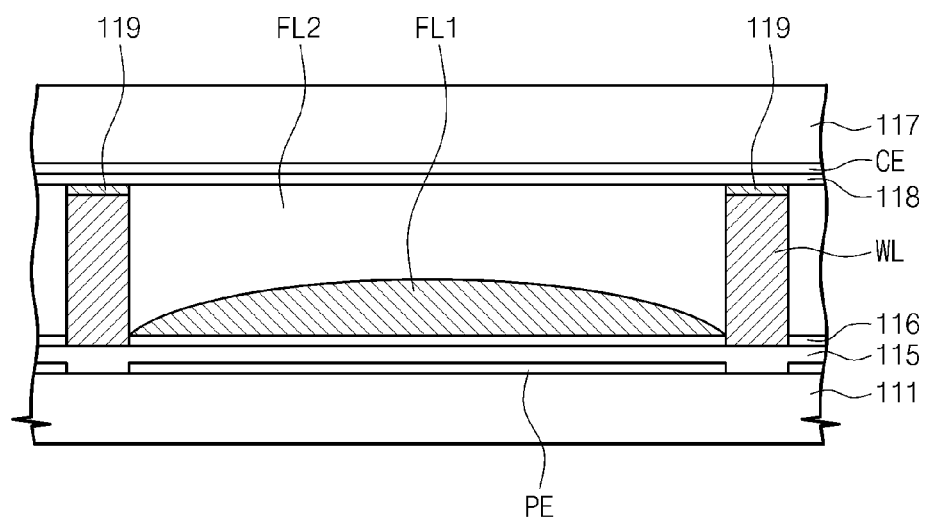
FIG. 11 is a cross-sectional view showing an electrowetting display device according to still another exemplary embodiment of the present invention.

FIG. 11 is a cross-sectional view showing an electrowetting display device according to another exemplary embodiment of the present invention.

Referring to FIG. 11, a display panel of the electrowetting display device according to another exemplary embodiment has the same structure and function as those of the display panel shown in FIG. 3 except that a fixing member 119 is interposed between the hydrophilic layer 118 and the partition wall WL. In FIG. 11, for the convenience of explanation, the layers disposed between the first base substrate 111 and the pixel electrode PE are omitted, but various layers may be interposed between the first base substrate 111 and the pixel electrode PE as described above.

The fixing member 119 is disposed on the upper surface of the partition wall WL, which faces the hydrophilic layer 118. In addition, the fixing member 119 includes a material to fix the partition wall WL to the hydrophilic layer 118, such as a resin. The fixing member 119 may be formed by coating the resin on a top surface of the partition wall WL and, if necessary, the step of hardening of the resin may be carried out additionally.

Further, the fixing member 119 serves as a sealing member to prevent a space from being formed between the hydrophilic layer 118 and the partition wall WL. Although not shown, the fixing member 119 may also be used in the display panels of FIG. 6 and FIG. 8.

Figure 12A:
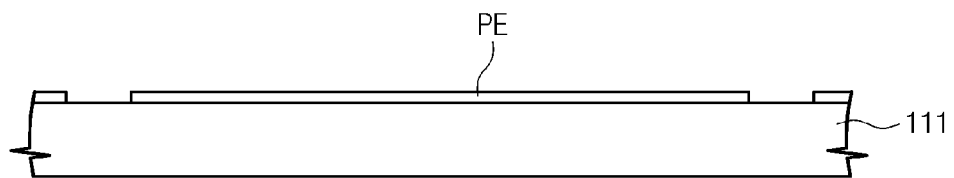
FIGS. 12A, 12B, 12C, 12D, 12E, 12F, and 12G are cross-sectional views showing a method of manufacturing a display panel shown in FIG. 9.
Figure 12B:
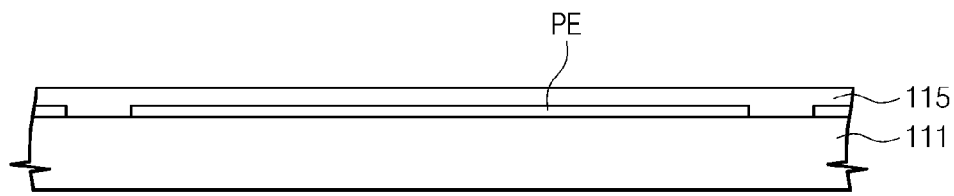
Figure 12C:
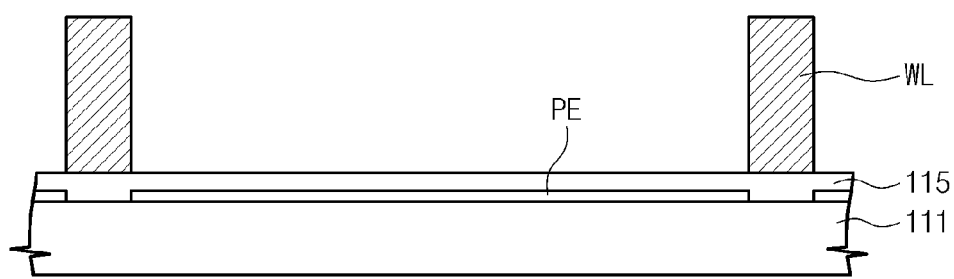
Figure 12D:
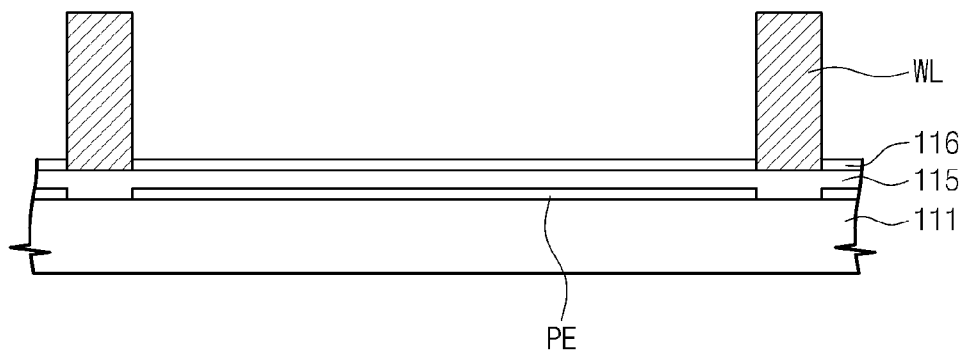
Figure 12E:
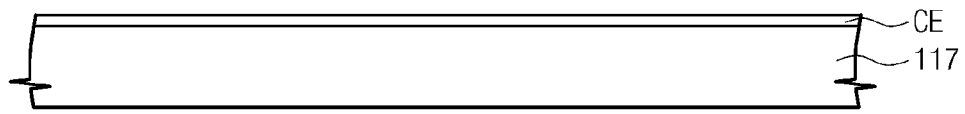
Figure 12F:
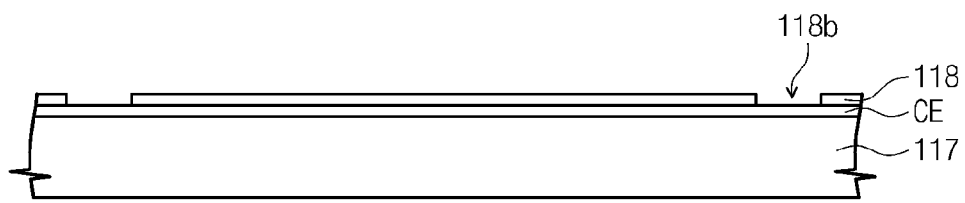
Figure 12G:
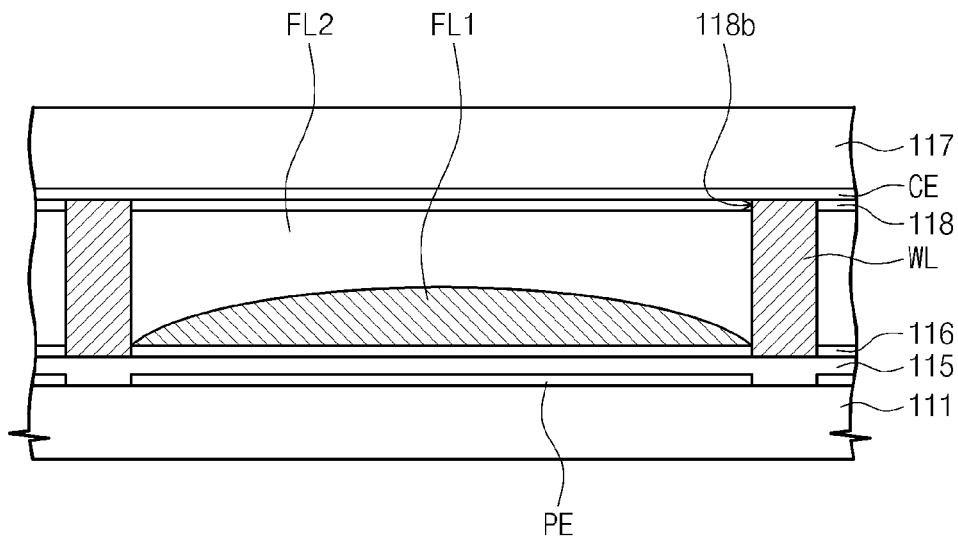

FIGS. 12A to 12G are cross-sectional views showing a method of manufacturing a display panel shown in FIG. 9. FIGS. 12A to 12D show processes of forming layers on the first base substrate 111 of the display panel 100, and FIGS. 12E to 12G show processes of forming layers on the second base substrate 117 of the display panel 100. Particularly, because processes performed prior to formation of the pixel electrode PE are known to a person of ordinary skill in the art, details thereof will be omitted.

Although not shown in the figures, the first gate line GLi-1, the second gate line GLi, and the gate electrode GE (shown in FIG. 2) are formed on the first base substrate 111. In addition, the gate insulating layer 112 is formed on the first base substrate 111 to cover the first gate line GLi-1, the second gate line GLi, and the gate electrode GE. Although not shown in the figures, the first data line DLj-1, the second data line DLj, and source and drain electrodes SE and DE are formed on the gate insulating layer 112.

In addition, the protective layer 113 and the organic insulating layer 114 are sequentially stacked on the gate insulating layer 112 (not shown in the figures). The protective layer 113 may be formed of silicon nitride (SiNx) or silicon oxide (SiOx) and the organic insulating layer 114 may be formed of acryl-based resin.

A transparent conductive material is formed on the organic insulating layer 114 and the transparent conductive material is patterned in the unit of one pixel, and thus the pixel electrode PE is formed in each pixel, as shown in FIG. 12A. Accordingly, the pixel electrode PE is spaced part from the pixel electrodes of the adjacent pixels.

Referring to FIG. 12B, the barrier layer 115 is formed on the first base substrate 111 to cover the pixel electrode PE using an insulating material. As an example, the barrier layer 115 may be formed of silicon oxide (SiOx) or silicon nitride (SiNx). In addition, the barrier layer 115 may have a thickness of about 0.1 nm to about 1 µm.

Referring to FIG. 12C, the partition wall WL is formed on the barrier layer 115 to partition the pixels from each other. As a result of the partition wall WL, the receiving area RA is defined in each pixel. The partition wall WL is located at a position between the pixel electrode PE and the pixel electrodes of the adjacent pixels. Although not shown in the figures, the partition wall WL may partially overlap the pixel electrodes when viewed in a plan view. In the present exemplary embodiment, the partition wall WL is formed of the organic insulating material with the hydrophilicity.

Referring to FIG. 12D, a hydrophobic material is coated on the barrier layer 115 on which the partition wall WL is not formed. The hydrophobic material is patterned to form the hydrophobic layer 116 on the barrier layer 115 in the receiving area RA. The hydrophobic layer 116 may be configured to include layers each having a surface modified to have the hydrophobic property.

Referring to FIG. 12E, a transparent conductive material is formed on the second base substrate 117 to form the common electrode CE. The common electrode CE is integrally formed as a single unitary and individual unit on the second base substrate 117.

Referring to FIG. 12F, the hydrophilic layer 118 having hydrophilicity is formed on the common electrode CE. The third openings 118b are formed through the hydrophilic layer 118 by using a patterning process.

The first base substrate 111 and the second base substrate 117 are coupled to each other so as to face each other. As a result, the display panel 110 is manufactured as shown in FIG. 12G. When the first and second base substrates 111 and 117 are coupled to each other, the upper portion of the partition wall WL is accommodated in the third openings 118b.

FIGS. 13A to 13D are cross-sectional views showing a display panel according to another exemplary embodiment of the present invention. In FIGS. 13A to 13D, the same reference numerals denote the same elements in FIGS. 12A to 12G, and thus detailed descriptions of the same elements will be omitted.

Figure 13A:
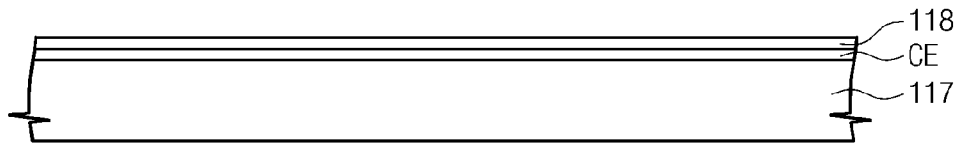
FIGS. 13A, 13B, 13C, and 13D are cross-sectional views showing a display panel according to still another exemplary embodiment of the present invention.

Referring to FIG. 13A, the common electrode CE and the hydrophilic layer 118 are sequentially formed on the second base substrate 117.

Figure 13B:
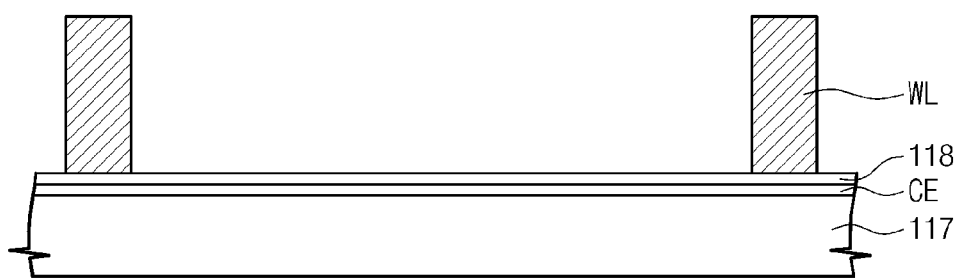

Referring to FIG. 13B, the partition wall WL is formed on the hydrophilic layer 118. In the present exemplary embodiment, the partition wall WL is formed of the same material as the hydrophilic layer 118. Thus, the hydrophilic layer 118 and the partition wall WL may be formed through the same process. In this case, the hydrophilic layer 118 and the partition wall WL may be integrally formed with each other.

Figure 13C:
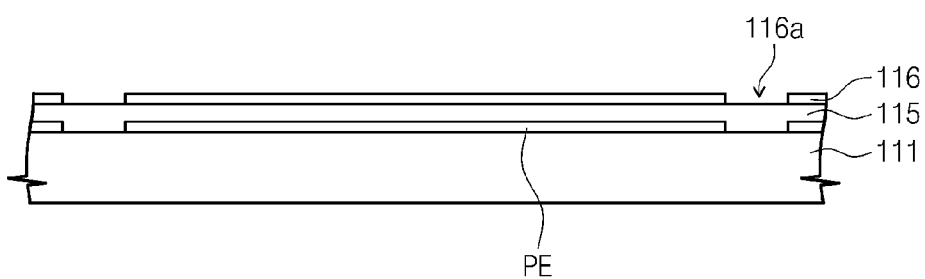
Figure 13D:
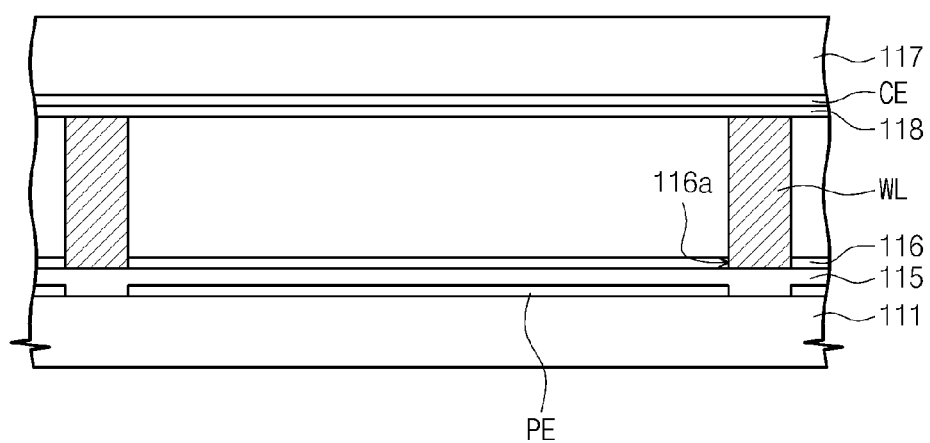

As shown in FIG. 13C, a hydrophobic layer 116 through which a fourth opening 116a is formed is formed on the barrier layer 115 to expose a portion of the barrier layer 115 corresponding to the partition wall WL.

Then, when the first and second base substrates 111 and 117 are coupled to each other, an end portion of the partition wall WL is accommodated in the fourth opening 116a formed through the hydrophobic layer 116. Accordingly, an adhesive force between the first base substrate 111 and the second base substrate 117 increases.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. An electrowetting display device comprising:
a first substrate;
a second substrate facing the first substrate;
a first electrode disposed on the first substrate;
a second electrode disposed on the second substrate so as to face the first electrode;
a plurality of partition walls disposed between the first and second electrodes, wherein the plurality of partition walls define a receiving area;
a hydrophobic layer disposed on the first electrode;
a hydrophilic layer disposed on the second electrode;
a plurality of first openings through the hydrophilic layer;
a plurality of second openings through the second electrode, wherein the plurality of second openings are substantially aligned with the first openings;
a plurality of third openings through the hydrophilic layer along the plurality of partition walls, wherein the plurality of third openings accommodate upper portions of the plurality of partition walls; and
first and second fluids accommodated in the receiving area and immiscible with each other, at least one of the first fluid and the second fluid having a polarity.

2. The electrowetting display device of claim 1, wherein the hydrophilic layer and the plurality of partition walls comprise the same material as each other.

3. The electrowetting display device of claim 2, wherein the hydrophilic layer and the plurality of partition walls comprise an organic insulating material having a hydrophilicity.

4. The electrowetting display device of claim 2, wherein a contact angle with respect to the hydrophilic layer is about 20° or less.

5. The electrowetting display device of claim 1, wherein the plurality of partition walls are disposed on the first substrate and physically contacts the hydrophilic layer.

6. The electrowetting display device of claim 5, wherein the plurality of partition walls have a height equal to or less than about 40 micrometers.

7. The electrowetting display device of claim 6, wherein the plurality of partition walls comprises an elastic material having a rate of change in height of about 2% or more with respect to the height of the partition wall.

8. The electrowetting display device of claim 1, further comprising a fixing member interposed between the hydrophilic layer and the plurality of partition walls, the fixing member being configured to fix the plurality of partition walls to the hydrophilic layer.

9. The electrowetting display device of claim 1, wherein the first fluid comprises a hydrophobic material and has one of red, green, and blue colors, and the second fluid comprises a transparent hydrophilic material having a polarity.

10. A method of manufacturing an electrowetting display device, comprising:
forming a first electrode on a first substrate;
forming a second electrode on a second substrate;
forming a hydrophilic layer on the second electrode;
forming a plurality of partition walls between the hydrophilic layer and the first electrode, wherein the plurality of partition walls define a receiving area;
forming a hydrophobic layer on the first electrode;
providing first and second fluids in the receiving area;
forming a plurality of first openings through the hydrophilic layer;
forming a plurality of second openings through the second electrode, wherein the plurality of second openings are substantially aligned with the first openings; and
forming a plurality of third openings through the hydrophilic layer along the plurality of partition walls, wherein the plurality of third openings accommodate upper portions of the plurality of partition walls,
wherein the first and second fluids are immiscible with each other and at least one of the first fluid and the second fluid has a polarity.

11. The method of claim 10, wherein the hydrophilic layer and the plurality of partition walls comprise the same material.

12. The method of claim 11, wherein the hydrophilic layer and the plurality of partition walls comprise an organic insulating material having a hydrophilicity.

13. The method of claim 11, wherein a contact angle with respect to the hydrophilic layer is about 20° or less.

14. The method of claim 10, wherein the plurality of partition are formed on the first electrode before the hydrophobic layer is formed on the first electrode, and the hydrophobic layer is formed on the first electrode except for an area in which the plurality of partition walls are formed.

15. The method of claim 10, wherein the plurality of partition walls are formed on the hydrophilic layer after the hydrophilic layer is formed on the second substrate.

16. The method of claim 10, wherein the plurality of partition walls and the hydrophilic layer are formed by a same process.

17. The method of claim 10, wherein a height of the plurality of partition walls is equal to or less than about 40 micrometers and comprises an elastic material with a rate of change in height of about 2% or more with respect to the height of the plurality of partition walls.

18. An electrowetting display device, comprising:
a first substrate;
a second substrate facing the first substrate;
a plurality of partition walls disposed between the first and second substrates, wherein the plurality of partition walls define a receiving area;
a hydrophobic layer disposed on the first substrate;
a hydrophilic layer disposed on the second substrate;
a plurality of first openings through the hydrophilic layer;
a plurality of second openings through the electrode, wherein the plurality of second openings are substantially aligned with the first openings;
a plurality of third openings through the hydrophilic layer along the plurality of partition walls, wherein the plurality of third openings accommodate upper portions of the plurality of partition walls; and
first and second fluids accommodated in the receiving area and immiscible with each other, at least one of the first fluid and the second fluid having a polarity.

19. The electrowetting display device of claim 18, wherein:
the electrode is a first electrode disposed on the second substrate; and
the electrowetting display device further comprises a second electrode disposed on the first substrate and facing the first electrode; and
wherein the first electrode and the second electrode are configured to generate a potential difference to move the first and second fluids in the receiving area.

20. The electrowetting display device of claim 18, wherein the hydrophilic layer and the plurality of partition walls comprise the same material as each other.

21. The electrowetting display device of claim 20, wherein the hydrophilic layer and the plurality of partition walls comprise an organic insulating material having a hydrophilicity.

22. The electrowetting display device of claim 18, wherein a contact angle with respect to the hydrophilic layer is about 20° or less.

23. The electrowetting display device of claim 18, wherein the plurality of partition walls have a height equal to or less than about 40 micrometers.

* * * * *